United States Patent [19]

Lucis

[11] Patent Number: 4,775,472
[45] Date of Patent: Oct. 4, 1988

[54] CAKE PRESSING SYSTEM WITH ANGLED BELT ROLLERS

[75] Inventor: Friedrichs Lucis, Roselle Park, N.J.

[73] Assignee: Inlay Inc., Califon, N.J.

[21] Appl. No.: 65,141

[22] Filed: Jun. 24, 1987

Related U.S. Application Data

[63] Continuation of Ser. No. 553,865, Nov. 21, 1983, abandoned, which is a continuation-in-part of Ser. No. 430,254, Sep. 30, 1982, abandoned.

[51] Int. Cl.$^4$ .............................................. B01D 33/00
[52] U.S. Cl. .................................... 210/386; 210/400; 210/456; 100/151; 100/152
[58] Field of Search ............... 100/118, 119, 120, 151, 100/152, 154; 210/400, 401, 456, 386

[56] References Cited

U.S. PATENT DOCUMENTS

| | | | |
|---|---|---|---|
| 1,172,783 | 2/1916 | French | 100/194 |
| 1,486,360 | 3/1924 | Brown | 100/152 X |
| 3,227,281 | 1/1966 | Peterson et al. | 210/401 X |
| 3,430,583 | 3/1969 | Pool et al. | 100/152 X |
| 3,517,819 | 6/1970 | Helland | 210/400 |
| 4,159,947 | 7/1979 | Brooks et al. | 100/151 X |

*Primary Examiner*—Charles Hart
*Attorney, Agent, or Firm*—Rohm & Monsanto

[57] ABSTRACT

A belt filter press-type apparatus receives a partially dewatered "cake" comprising a liquid/solid suspension which has been processed by conventional liquid/solid separation equipment; the apparatus removing additional moisture from the cake. The apparatus comprises two liquid-permeable belts which are driven by belt driving means along respective predetermined paths. The belts, however, share respective portions of their paths substantially in common. The cake is sandwiched between the two belts and driven through the common portions of the respective belt paths. The combination of the belts with the the cake interposed therebetween meanders around a plurality of rollers which create tension and pressure on the belt and the cake, thereby driving part of the liquid content out of the trapped suspension. The rollers are arranged at an angle with respect to the horizon so that the top surface of the upper belts is not horizontal thereby allowing the liquid expressed through the top belt to drain off before it is reabsorbed.

6 Claims, 4 Drawing Sheets

CAKE PRESSING SYSTEM WITH ANGLED BELT ROLLERS

This application is a continuation of application Ser. No. 553,865, filed 11/21/83, now abandoned, which is a continuation-in-part of application Ser. No. 430,254, filed 9/30/82, now abandoned.

BACKGROUND OF THE INVENTION

This invention relates to liquid/solid separation systems and, more particularly, to an improved belt filter press for removing excess liquid from a partially dewatered liquid/solid suspension.

In the process of making many solid waste by-products, and in the field of industrial and municipal water and wastewater treatment, a number of devices are utilized in the general category of liquid/solid separation. These devices include centrifuges, screw presses, vacuum filters, belt filter presses, pressure filters and others. Although they all operate on different principles, the basic purpose of each is to receive a pumpable liquid/solid suspension, to accomplish as complete a separation as possible of the solid suspended matter from the liquid, and to discharge the suspended matter in a semi-solid non-pumpable form, referred to as "cake".

The principle of operation of the device for which patent application is being made is a modification of the concept used in the devices generally categorized as "belt filter presses". Reference to FIG. 1 and 2, showing a typical prior art belt filter press will illustrate the principle of operation of belt filter presses.

A slurry 10 comprised of liquid and solids is pumped onto a horizontally positioned portion 13 of a belt 11. Belt 11 is of a liquid-permeable material, generally a polyester fabric. In most cases some type of organic compound has been added to the slurry to make it more amenable to filtration. A second similar belt 12 then converges on top of belt 11, trapping slurry 10 between the two belts. The sandwiched material then passes over any number of rollers, illustratively rollers 7, 8 and 9, which rotate around shafts 3, 4 and 5, respectively, in FIGS. 1 and 2. The liquid is driven from the solids by the tension created in the device or by direct application of pressure. The vertical arrows in FIG. 1 indicate the direction of flow of expressed liquid. A semi-solid cake 15 is discharged at the point where belts 11 and 12 diverge.

In all of the various designs of belt filter presses, provisions are made for cleaning both belts with high-pressure wash-water before the belts make contact with the incoming slurry. In addition, provisions are generally made to ensure that the belts remain centered on the rollers, since they are driven toward the direction of discharge and have a tendency to wander to one side of the machine or the other. However, the number of rollers, the relative diameters of the rollers with respect to one another, and the relative positions of the rollers with respect to one another differ greatly from one design to another.

One of the major deficiencies in all belt filter press designs is that the moisture removal efficiency is not as high as should be theoretically attainable. The primary cause for this inability to achieve optimum performance is that the moisture which is expressed through the top belt 12 has no means of being removed and is eventually reabsorbed by the filter cake.

All existing belt filter press designs incorporate rollers which are on a horizontal plane as illustrated in FIG. 3 which shows the orientation of roller 7, as viewed from the slurry feed end of the belt filter press shown in FIGS. 1 and 2. Roller 7 rotates about shaft 3. Left end 30 of shaft 3 is the same distance x from a horizontal reference plane 35 as is right end 31. A horizontal reference plane is defined as any plane parallel to horizontal portion 13 of the path traveled by belt 11. Because of this orientation, the force of gravity acts upon the moisture expressed through the top belt 12 with the solids captured between the two belts as an intermediary only in a downward direction whereby the gravity force vector is perpendicular to the plane of the trapped solids causing liquid expressed through the top belt to be reabsorbed through the fabric back into the trapped slurry.

SUMMARY OF THE INVENTION

The foregoing and other problems with known belt filter systems are alleviated by the present invention which provides a roller support arrangement wherein the rollers are supported in a fixed, predetermined orientation with respect to one another such that each assumes a predetermined angular orientation with respect to a horizontal reference plane. In accordance with the invention, at least some of the rollers are tilted with respect to the horizontal reference plane, such that as the combination of the two belts with the slurry interposed therebetween is driven through a meandering path defined by the rollers. Liquid which is expressed through the top belt of the combination flows off of the belt in a direction which is generally transverse to the direction of travel of the combination. It is a feature of this invention that such tilting is achieved while a portion of the lower belt which receives the initial deposit of the slurry is maintained parallel to the horizontal plane at reference. The apparatus is ideally suited to receive discharged cake from any liquid/solid separation equipment, to remove additional moisture from such cake, and to discharge the processed cake with a lower moisture content than with which it was received.

In a particularly advantageous embodiment of the invention, the slurry which is deposited in the horizontal position of the lower belt is distributed uniformly substantially throughout the width of the belt by a cake spreading mechanism. The cake spreading mechanism basically comprises a cylindrical roller which is provided with at least one raised portion having a generally helical configuration about the roller. The improved belt filter press or cake pressing apparatus differs from typical belt filter presses in that at least some of the rollers are oriented at an angle from horizontal, rather than being completely horizontal in orientation. The degree of angle is not as critical as is the fact that this orientation allows gravity to act upon the liquid expressed through the top belt, permitting the liquid to flow off before it can be reabsorbed by the cake. As a result, the deposited cake emerges from the cake pressing apparatus of the instant invention with less moisture content than it originally contained.

It is accordingly a principal object of this invention to provide an apparatus which can remove a greater amount of moisture from previously dewatered liquid/solid suspensions then can known arrangments.

It is another object of this invention to provide a unique orientation of components to remove additional moisture, which would normally be reabsorbed in devices which incorporate prior art technology.

It is yet another object of this invention to provide a particular relationship between components of the device which will result in the ability to utilize existing technology in the manufacture of certain components which are utilized in the device.

BRIEF DESCRIPTION OF THE DRAWINGS

These and other objects, features and advantages will be better appreciated from consideration of the following detailed description read in conjunction with the accompanying drawings, wherein.

DETAILED DESCRIPTION OF THE INVENTION

Figure 4:
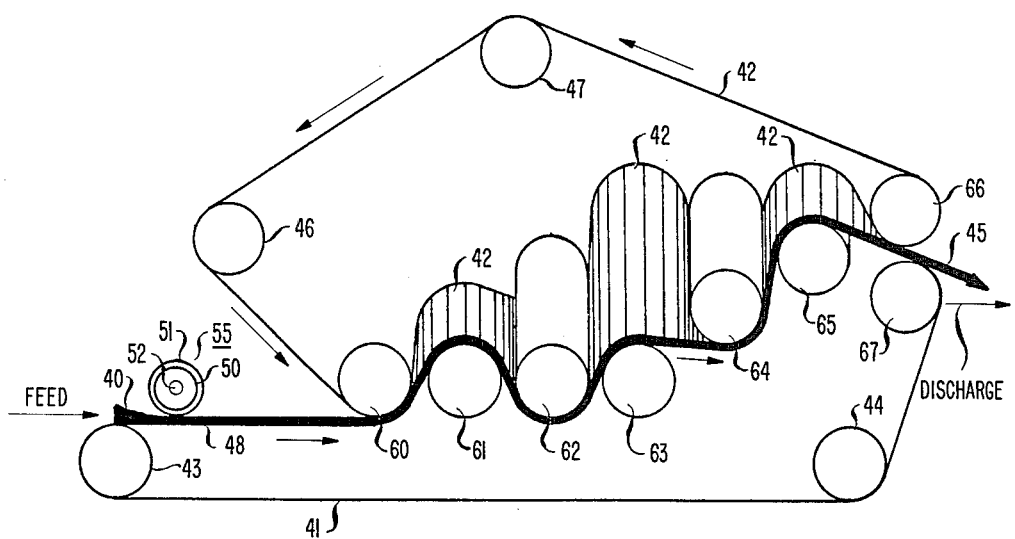
FIG. 4 is a schematic representation of a side elevation of a cake pressing apparatus constructed in accordance with the invention.

Referring to FIG. 4, a previously dewatered cake 40 is deposited on a horizontal portion 48 of a bottom belt 41 of a belt filter press-type apparatus. Belt 41 is driven along a predetermined meandering path around guide rolls 43 and 44 and alternately between rollers 60 to 67 by motorized means (not shown) which are well known in the art for driving the belt at a constant rate of speed in the direction of the arrows on FIG. 4. A top belt 42 is driven in a continuous loop along a predetermined path around guide rolls 46 and 47 and alternately between rollers 60 to 67 in the direction of the arrows shown in FIG. 4. Over a certain portion of the respective paths of belts 41 and 42, they travel parallel to each other, i.e., through that portion of the path that traverses between rollers 60 to 67. Partially dewatered cake 40 is sandwiched between belts 41 and 42 at the point where they pass first roller 60.

Belts 41 and 42 may comprise any of several liquid-permeable fabrics which are well known to those of ordinary skill in the art as suitable for this purpose. Belt cleaning means (not shown) are provided to rinse both top and bottom belts with high-pressure wash water at some point after the cake has been discharged and before the belts contact the incoming feed material. Such belt cleaning means are well known in the art. In addition, means for ensuring that the belts remain centered on the rollers, such as are well known to those of ordinary skill in the art, are provided, since the belts have a tendency to wander to one side or the other due to uneven forces created within the press.

Figure 5:
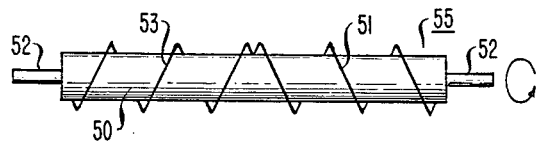
FIG. 5 illustrates an advantageous embodiment of a cake spreading mechanism as viewed from the feed end of a cake pressing apparatus such as shown in FIG. 4.

In a particularly advantageous embodiment, a cake spreading mechanism 55 distributes cake 40 to a uniform thickness before it is driven past the first roller 60. A particularly useful embodiment of a cake spreading device is shown in FIG. 5 which shows cake spreader 55 having a cylindrical roller 50 which is driven about a horizontally disposed longitudinal axis 52 by motorized means (not shown) which are well known in the art. In the embodiment, roller 50 has raised helical portions 51 and 53 which originate at the center of roll 50 and coil in opposite directions.

Figure 1:
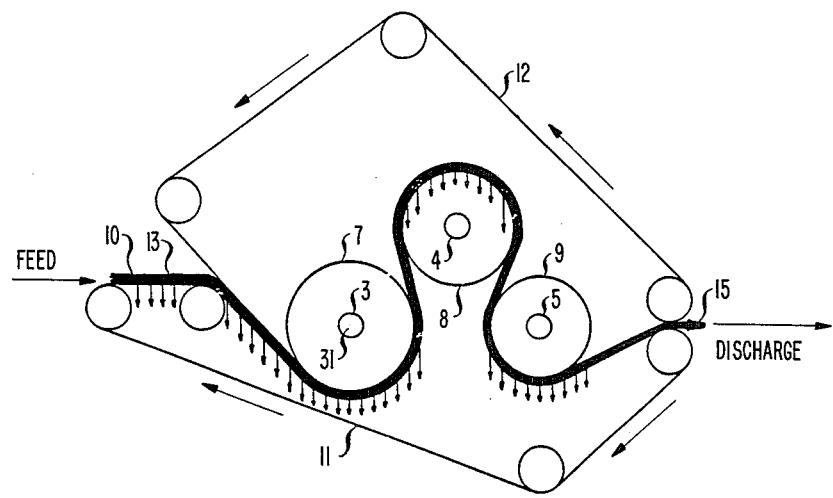
FIG. 1 is a side view schematic of a typical prior art belt filter press.
Figure 2:
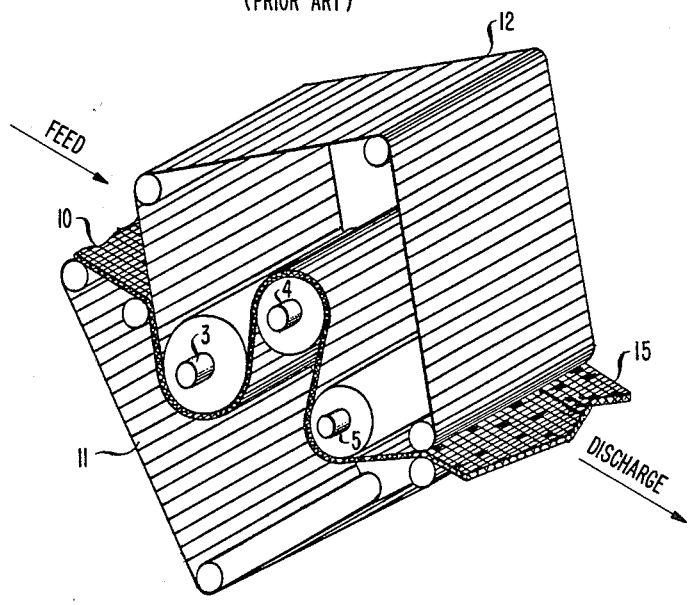
FIG. 2 is an isometric view of a typical prior art belt filter press.

The cake pressing device of FIG. 4 differs from the typical belt filter presses of FIGS. 1 and 2 in that at least some of the rollers (61–65) are oriented at an angle from the horizontal. The top surface of belt 42 is visible on FIG. 4 over rollers 61, 63 and 65 which are canted so that the left side is higher than the right side as viewed from the feed end of the apparatus. The top surface of belt 42 is not visible over rollers 60, 66 and 67 which are oriented parallel to the horizontal, as are rollers 7, 8 and 9 of FIGS. 1 and 2.

The actual angles chosen for the inclination of the rollers are not critical. However, certain rules must be followed, as will be described below, to ensure that the top and bottom belts do not have to be longer on one side than the other. The sloping orientation of the angled rollers in the inventive cake pressing apparatus allows gravity to act upon the liquid expressed through the top belt in a direction other than purely vertical as shown in FIG. 1 wherein the liquid is reabsorbed into the trapped slurry. This orientation permits liquid to drain off in the direction of the downward incline before it is reabsorbed into the trapped slurry or cake. As a result, cake 45 emerging from the discharge end of the apparatus of FIG. 4 will have less moisture content than cake 40 which was fed into the known apparatus.

Figure 6:
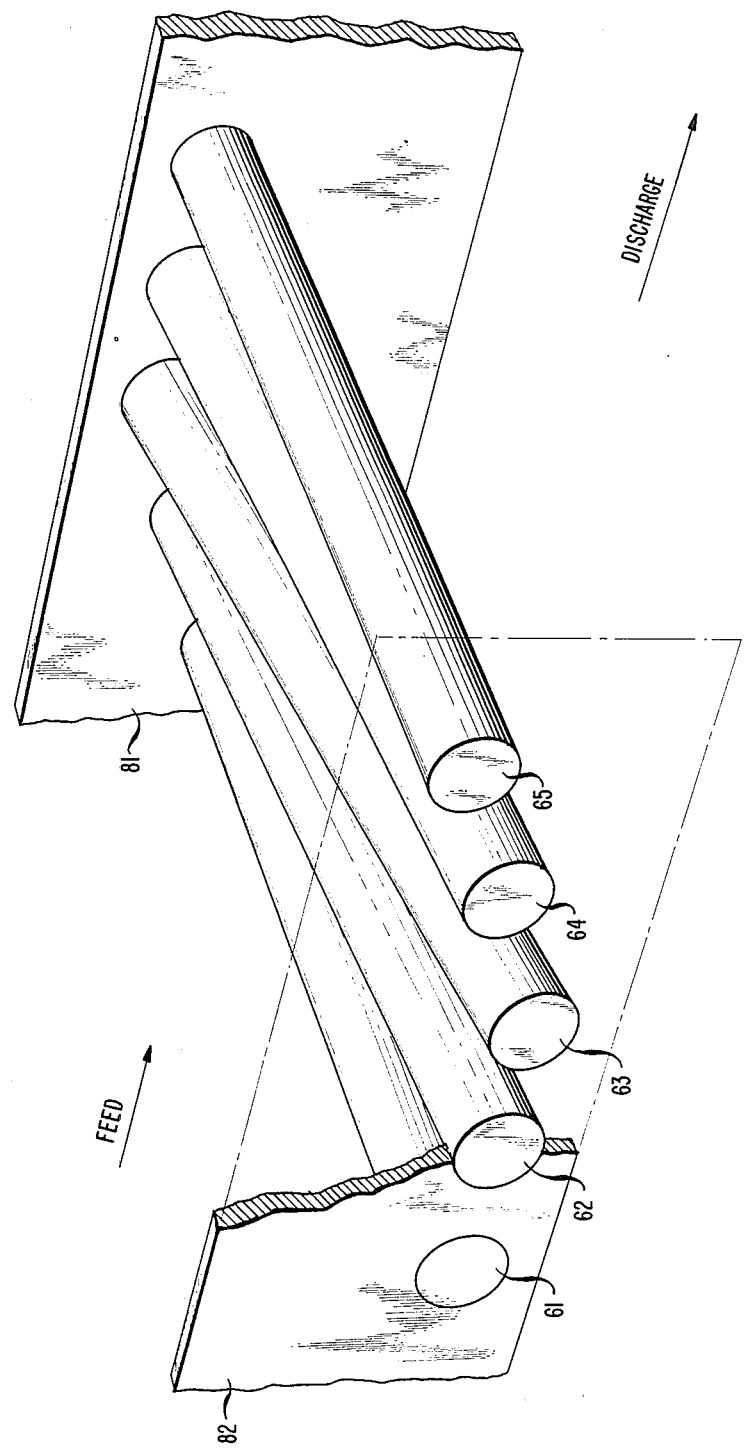
FIG. 6 is a perspective view of the angled rollers of the cake pressing apparatus of FIG. 4.

FIG. 6 shows a perspective view of the angled rollers 61 to 65 of the cake pressing apparatus shown semi-diagrammatically in FIG. 4. This illustration shows the downward inclination provided by the canted rollers more clearly than does FIG. 4. It is to be understood that all of the rollers rotate about longitudinal shafts (such as are shown in FIGS. 1 and 2) by drive means which are not shown because they are well known in the art. Plates 81 and 82 are shown to illustrate that the rollers are disposed on a support structure of a kind which is well known, or which can be easily devised, by those of ordinary skill in the art.

Figure 3:
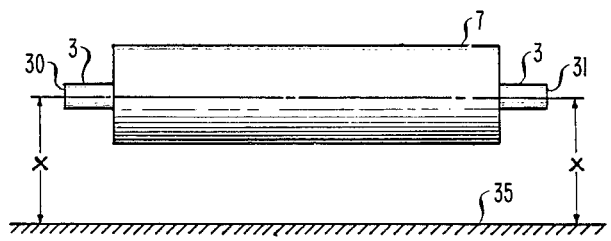
FIG. 3 is a representation of the orientation of a typical prior art belt filter press roller as viewed from the feed end of the known belt filter press shown in FIGS. 1 and 2.
Figure 7:
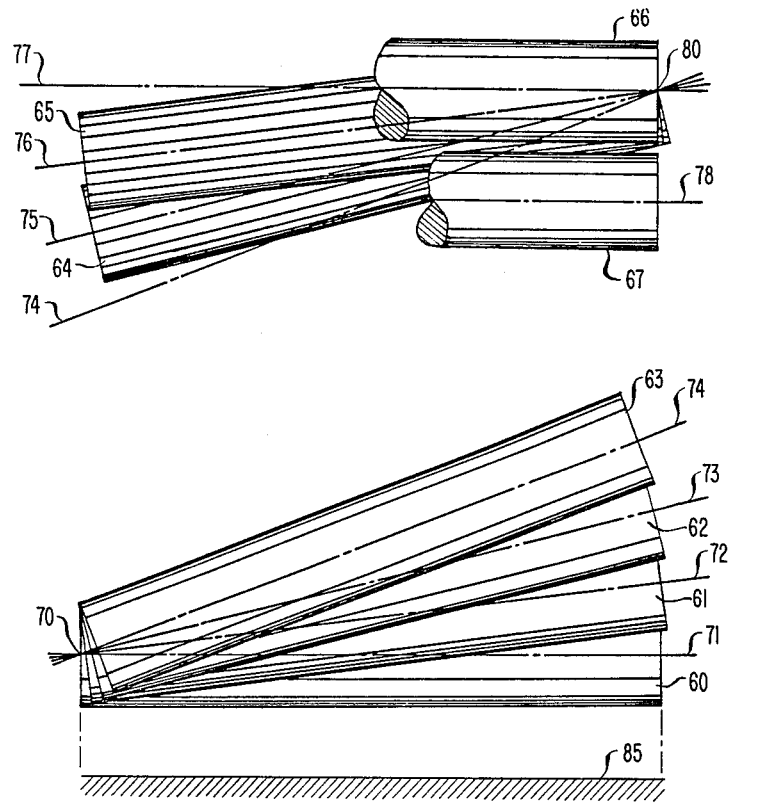
FIG. 7 is a semi-diagrammatic view of the roller orientation of the cake pressing apparatus of FIG. 4 as viewed from the discharge end of the apparatus.

In order to understand more readily the inclination of the rollers in the apparatus shown in FIGS. 4 and 6, reference is made to FIG. 7 which depicts rollers 60 to 67 as they would be viewed from the discharge end of the apparatus of FIG. 4. The array of rollers has been separated into two portions to enable an unobstructed view of all of the rollers. Rollers 60, 66 and 67 are horizontally disposed, i.e., the distance from a horizontal reference plane 85 is the same for both the left and the right ends of rollers 60, 66 and 67. Rollers 60, 66 and 67 have centerlines designated 71, 77 and 78, respectively. This can be compared with the positioning of rollers 7, 8 and 9 in FIG. 1 as illustrated in FIG. 3. Reference plane 85 could be the floor upon which the apparatus sits or the horizontal portion 48 of belt 41, for example.

Roller 61 is canted at an angle Alpha with respect to the horizontal reference plane, with its right side being higher than the left. Note that the left side would be higher in FIGS. 4 and 6 since FIG. 7 is viewed from the discharge end. Centerline 72 of roller 61 intersects centerline 71 of roller 60 at point 70, indicating that rollers 60 and 61 are the same vertical distance from the horizontal reference plane 85 at their left ends. Roller 62 is canted at an angle Beta with respect to the horizontal reference plane 85. Centerline 73 of roller 62 intersects centerline 71 at point 70 also indicating that rollers 60, 61 and 62 are the same distance from horizontal on their left side. The right side of roller 62 is higher than the right side of roller 60 or 61. Roller 63 is canted at angle Phi with respect to the horizontal. The right end of roller 63 is higher than the right ends of roller 62, 61 and 60. However, centerline 74 also intersects centerline 71 at point 70 on the left end of roller 63, indicating that it is located the same distance from horizontal on the left end as are the previously mentioned rollers 62, 61 and 60.

Centerline 74 is reproduced on the upper portion of FIG. 7 to indicate the relative positioning of the two groups of rollers. Roller 64 is canted at angle Beta with its right end higher than its left end. Centerline 75 intersects centerline 74 at point 80 on the right side, indicating that rollers 63 and 64 are positioned at the same vertical distance from the horizontal reference plane 85 on the right hand side. Note; however, that roller 64 is higher than roller 63 on the left hand side. Roller 65, the last of the angled rollers, is canted at angle Alpha with respect to the horizontal, the right end of roller 65 being higher than the left end. Centerline 76 of roller 65 intersects centerlines 75 and 74 at point 80, indicating that rollers 63, 64 and 65 are all disposed at the same distance from the horizontal at the right hand side.

This illustrative embodiment demonstrates the practice of several principles which must be applied to ensure that the top and bottom belts are not required to be longer on one side than the other, thus requiring a seam that would traverse the filter belt threads in both directions thereby reducing the strength of the belts. If any number of random angles were provided to produce the inclination of the rollers, then seams other than perpendicular to the direction of belt travel would have to be used. However, if the number of rollers, which are oriented at an angle from horizontal is made to be an odd integer greater than or equal to three (3) and the number of different angles chosen for the rollers does not exceed one-half the angled rollers $+1$ or $(n+1)/2$, n, being the number of angled rollers, this criterion will be met. In the instant case, there are five angled rollers 61 to 65 and $n=5$, which conforms to the requirement that n be greater than or equal to 3. Three angles (Alpha, Beta and Phi) were provided which is less than or equal to $(5+1)/2$ or 3. If seven angled rollers are provided in the cake pressing apparatus, then $(7+1)/2$ or 4 different angles could be utilized.

Figure 8:
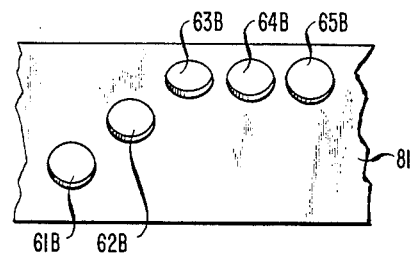
FIG. 8 is the left side interior of the support structure for the filter press rollers shown in FIG. 6; and, FIG. 9 is the right side exterior of the support structure for the filter press rollers shown in FIG. 6.
Figure 9:
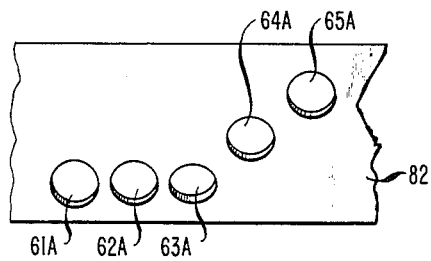

Furthermore, when viewing each side of the cake pressing apparatus of the instant invention independently from the exterior or the interior, the location and direction of the angled roller shafts must be the inverted mirror image of the other side. FIGS. 8 and 9 illustrate this aspect of the invention by showing the position of the roller shaft hole locations in the support structure of FIG. 6. FIG. 8 shows the left side interior 81 of the support structure with the roller shaft hole locations 61B to 65B corresponding to angled rollers 61 to 65. FIG. 9 shows the right side exterior 82 of the support structure and the corresponding shaft hole locations 61A to 65A.

It is to be understood that the above-described example is merely illustrative of the many possible specific embodiments which can be devised to represent application of the principles of the invention. Numerous and varied arrangements can be devised with these principles without departing from the spirit and scope of the invention. In particular, the device could be used as the primary source of liquid removal if the slurry can be spread evenly. The rollers can have varied diameters and angles of inclination within the given parameters.

What is claimed is:

1. A belt filter pressing apparatus of the type having a first belt which is fluid-permeable for transporting a liquid/solid suspension thereon, a liquid/solid suspension being disposed on the first belt, a second belt which is fluid-permeable and arranged to overlie the liquid/solid suspension on the first belt, the apparatus further comprising:
   a plurality of roller means each having a longitudinal axis of rotation, the plurality of roller means defining a cross-sectionally meandering path for the first and second belts and the liquid/solid suspension therebetween;
   drive means for moving the first and second belts with the liquid/solid suspension therebetween along said meandering path in said pressing zone and in a predetermined direction of travel, whereby the liquid in the liquid/solid suspension is pressed through the first and second belts; and
   roller support means having first and second portions corresponding to inverted mirror images of one another for supporting each of the plurality of roller means at respective ends thereof at different heights in a predetermined orientation with respect to one another whereby said longitudinal axis of each of said roller means is arranged at a respective, predetermined angular orientation with respect to horizontal and vertical reference axes whereby a portion of the liquid which is pressed from the liquid/solid suspension through the first and second belts flows off of the belts in a direction which is generally transverse to the predetermined direction of travel of the first and second belts along the meandering path.

2. The apparatus of claim 1 wherein at least one of the plurality of roller means is arranged to be parallel with said horizontal reference axis and remaining ones of said plurality of roller means in said pressing zone are symmetrically angled with respect to said vertical and horizontal reference axes.

3. The apparatus of claim 1 wherein said roller support means comprises first and second support structures for supporting respective ends of each of said roller means, said first and second support structures each being provided with a plurality of roller means support holes for securing respective ends of said roller means to said first and second support structures, said plurality of roller means support holes being distributed in a predetermined, respective arrangement on each of said support structures, said respective arrangements of roller means support holes being arranged whereby lowermost ends of said roller means are canted forward in said predetermined direction of travel of the first and second belts.

4. The apparatus of claim 1 wherein there is further provided distribution means for distributing the liquid/solid suspension across the first belt before the liquid/solid suspension is driven through said pressing zone.

5. The apparatus of claim 4 wherein the distribution means comprises a rotationally driven cylinder having a longitudinal axis which traverses the width of the first belt, said cylinder having at least one raised helix thereon for communicating with the liquid/solid suspension.

6. The apparatus of claim 5 wherein said rotationally driven cylinder has two raised helical portions thereon, one portion originating at the center of said cylinder and winding in a clockwise direction and the other portion originating at the center and winding in a counter-clockwise direction, for spreading the liquid/solid suspension substantially throughout the width of the first belt.

* * * * *